US006104157A

United States Patent [19]

Kramer et al.

[11] Patent Number: 6,104,157

[45] Date of Patent: Aug. 15, 2000

[54] APPARATUS AND METHOD FOR CONTROLLING AN ELECTRICAL STARTER OF AN INTERNAL COMBUSTION ENGINE

[75] Inventors: Claus Kramer, Besigheim; Wolfgang Seils, Ludwigsburg; Henning Stoecklein, Eberdingen; Jan Freitag, Bielefeld, all of Germany

[73] Assignee: Robert Bosch GmbH, Stuttgart, Germany

[21] Appl. No.: 09/146,144

[22] Filed: Sep. 3, 1998

[30] Foreign Application Priority Data

Oct. 11, 1997 [DE] Germany ........................... 197 45 115
Mar. 14, 1998 [DE] Germany ........................... 198 11 176

[51] Int. Cl.$^{7}$ ........................................ H02P 1/16

[52] U.S. Cl. ........................... 318/445; 318/431; 318/430

[58] Field of Search ..................................... 318/445, 431, 318/430; 123/438

[56] References Cited

U.S. PATENT DOCUMENTS

| | | | |
|---|---|---|---|
| 4,305,002 | 12/1981 | Mortensen | 290/38 R |
| 4,412,137 | 10/1983 | Hansen et al. | 307/10 R |
| 4,743,816 | 5/1988 | Prather | 318/455 |
| 4,755,689 | 7/1988 | Porter | 290/38 R |
| 4,862,010 | 8/1989 | Yamamoto . | |
| 4,917,410 | 4/1990 | Cummins et al. | 290/38 R |
| 4,988,273 | 1/1991 | Faig et al. | 425/145 |
| 5,383,428 | 1/1995 | Fasola et al. | 123/179.3 |
| 5,622,148 | 4/1997 | Xue et al. . | |

FOREIGN PATENT DOCUMENTS

| | | |
|---|---|---|
| 2 749 451 | 12/1997 | France . |
| WO 92/06290 | 4/1992 | WIPO . |

*Primary Examiner*—Robert E. Nappi
*Assistant Examiner*—Rita Leykin
*Attorney, Agent, or Firm*—Michael J. Striker

[57] ABSTRACT

The apparatus for controlling an electrical starter motor for cranking a cranking mechanism of an internal combustion engine to start the engine includes a circuit for making an electrical connection between a voltage source and the starter motor by which the starter motor is coupled with a cranking gear of the engine by means of a shiftable transmission when the circuit is energized and an electronic control unit for controlling at least one of a voltage, a current and an on-time of the electrical starter motor in a stepwise manner in a two-stage control process including a first stage in which the starter motor is coupled with the cranking gear and operated at a reduced rotation speed to reduce wear. The electronic control unit is electrically connected between the voltage source and the starter motor and is an electronic relay that includes a central processing unit and at least two electronic power switches for switching the voltage of the starter motor.

23 Claims, 4 Drawing Sheets

APPARATUS AND METHOD FOR CONTROLLING AN ELECTRICAL STARTER OF AN INTERNAL COMBUSTION ENGINE

BACKGROUND OF THE INVENTION

1. Field of the Invention

The present invention relates to an apparatus and method for controlling an electrical starter motor for cranking or starting an internal combustion engine, comprising a circuit means for making an electrical connection between a voltage source and the electrical starter motor, in which the electrical starter motor is coupled with a crank gear of the internal combustion engine by means of a shiftable transmission when the circuit means is energized.

2. Prior Art

It is known that an internal combustion engine in a motor vehicle must be started by means of a starter motor, since it cannot be started alone without other means. Usually an electrically driven starter motor, that is connected with a voltage source by means of a starter relay formed as a so-called engagement or tripping relay, is provided for this purpose. At the same time a pinion of the starter motor is put into engagement with a crown gear usually provided on a flywheel of the internal combustion engine for making an operative connection. Immediately after starting the internal combustion engine the starter motor must be disengaged in order to prevent increased wear and loud noise generation.

The making of the operative connection, which means engagement of the starter pinion at the approximate nominal rotation speed and operation of the starter motor at its nominal voltage causes a comparatively strong torque and a high wear on the crown gear and the starter motor. Especially in starters for commercial motor vehicles increased requirements, because of, for example, more-frequent-than-usual starting for predominantly shorter trips are especially difficult to satisfy with the known starters.

In starter units for buses in which the internal combustion engine is located at the rear end of the bus so that the starting process cannot be clearly heard and thus followed by the driver, additional arrangements that provide for an effective protection for the starter and the crown gear are unavoidable. A so-called electronic starting relay is used for this purpose, by which the starter can be protected from damage in many respects. After successful starting of the internal combustion engine a delay-free shut off of the starter occurs. Furthermore the electronic starter relay prevents activation of the starter when the internal combustion engine is already or still running. In the event that the internal combustion engine is still running or of a false start also a timing switch is activated which prevents a further starting attempt too soon thereafter.

Of course damage caused by incorrect or false operation of the starter relay by the driver can be prevented, but not increased wear caused by frequent operation and/or by many years of operation. In order to provide an altogether increased lifetime and to satisfy requirements due to more-than-average operation of the starter, an over-dimensioning of the electrical starter motor and/or the effective connection with the internal combustion engine cannot be avoided with the known starter devices, which increases both the manufacturing costs and also the vehicle weight.

SUMMARY OF THE INVENTION

It is an object of the present invention to provide an improved apparatus for controlling an electrical starter motor for cranking or starting an internal combustion engine, which does not have the above-described disadvantages.

It is another object of the present invention to provide an improved method for controlling an electrical starter for cranking or starting an internal combustion/engine, which does not have the above-described disadvantages.

These objects, and others which will be made more apparent hereinafter, are attained in an apparatus for controlling an electrical starter motor for cranking or starting an internal combustion engine, comprising circuit means for making an electrical connection between a voltage source and the electrical starter motor, and with which the electrical starter motor is coupled with a crank gear of the internal combustion engine by means of a shiftable transmission on activation or operation of the circuit means.

According to the invention, the apparatus for controlling the electrical starting motor includes an electronic control unit having means for controlling at least one of a voltage, a current and an on-time of the electrical starter motor and the electronic control unit is connected between the voltage source and the electrical starter motor.

In the method according to the invention the electrical starter motor is operated in two stages by stepwise control of a current and/or a voltage and/or an on-time of the starter by means of an electronic control unit connected between the voltage source and the electrical starter motor.

The apparatus and method according to the invention have the advantage that the load on the starter motor of the internal combustion engine can be greatly reduced by a gentle engagement with reduced rotation speed and reduced torque and consequently reduced wear on the starter motor and the crown gear meshing with the starter pinion in the drive train of the internal combustion engine. A two-stage or two-step control of the electrical starter motor and thus the starting process of the internal combustion engine can be accomplished in an advantageous manner by means of a suitable control of the control unit connected electrically between a voltage source and the electrical starter motor. An electronic control unit is preferably arranged between the voltage source and the electrical starter motor which permits controlling a voltage and/or a current for the electrical starter motor. The starter meshing process is controlled by the electronic two-step control method in such a way that the wear on engagement and following engagement of the starter pinion is clearly reduced.

In a first stage the starter motor is operated with a reduced torque and the pinion engages with the crown gear, preferably on the flywheel of the internal combustion engine, with reduced speed. The reduced rotation speed of the starter motor makes finding a gap in the gear teeth easier and the slow pinion advance reduces the wear due to impacts of the pinion with the crown gear. In the second stage the engagement relay then acts with the nominal voltage so that the pinion can be completely engaged in the crown gear. Next the main bridge closes and the starter applies its full torque. A "rattling" of the starter can thus be avoided.

In a preferred embodiment the electronic control unit, a so-called integrated electronic relay, has a central control unit (CPU), that permits optimum control of a great number of different starters with a little adjustment in its programming. Preferably the electronic control unit has at least two electronic power switches, for example in the form of power transistors or power-MOS-FETs, that can reliably switch high power with very little control voltages and currents from the CPU. A redundancy can be attained by means of a series circuit of at least two electronic power switches which can reliably prevent damage to the electrical starter motor and which can avoid the danger of unwanted starts on occurrence of erroneous operation.

Advantageously the at least two electronic power switches have respective charge pumps for their control and respective protective electronics, which guarantee protection against excessive temperature and/or polarity inversion. Furthermore each electronic power switch has a diagnostic terminal, with whose aid a continuous monitoring of the actual switch state and thus a correct running control of the two-step starter process is possible by means of the CPU. In an additional advantageous embodiment an integrated electronic relay (IER) with additional control functions and inputs is provided, which for example monitors the supplied voltage, the occurring temperatures in the starter motor and/or the possible overload state of the electronic power switch.

An electrical circuit for operation of the electrical starter motor can, for example, be a manually operable starting switch or an electronically operable starting switch that is controllable in an advantageous manner by motor electronics.

When self-sustained operation of the internal combustion engine is achieved, the starting process automatically ends whereby the engagement duration and load on the starter motor is minimized.

A purely electronic control of the above-described two-stage or two-step starter control of the starter behavior is especially advantageous. The electrical starter motor used can be largely conventional in its structure and scarcely any additional electronic and/or mechanical parts are necessary. Advantageously, when the starter rely is controlled pulsed in an engagement phase following a holding phase, its thermal load can be reduced. The electronic power switch can be a so-called power-MOS-FET with control, protective electronic and diagnosis functions, so that a very efficient and compact structure results. However similarly discrete structures with MOS-FETs or other transistors are possible with appropriately increased circuit expense.

A certain redundancy is advantageously included in the circuitry of the invention, which avoids unwanted starting events and thus safety-critical situations occurring when one of the power switches is shorted or breaks down. Advantageously additional functions can be performed, such as monitoring the starting temperature by means of a temperature sensor, a starting time limit and a final stage test and/or an idle circuit detection. In an idle circuit the starter pinion, for example because of dirt, remains stopped in a first stage and is not completely engaged. The starting process must be interrupted, since the thermal load on the engagement relay can become too large.

The first electronic power switch has a so-called sensor output at which a current-proportional output signal appears in an advantageous embodiment. On closing of the main bridge of the starter relay the current must pass through a resistor, which can be detected at the sensor output. If this current decrease cannot be detected after expiration of an observation time (for example 200 msec), an idle circuit is detected and the starting process is interrupted. If the upper end stage is shorted, a voltage is measured at its terminal, also when the end stage can be shut off. The starter would be put in rotation in this case, however not engaged. A discrete running control would be possible instead of an integrated CPU, but that would entail a larger construction expense inclusive of the advantageous additional functions.

A gentle noise reduction is advantageously possible in the two-step starter control method according to the invention. Also the lifetime of the crown gear is lengthened. The starter can be more easily constructed since the thermal load is less. The lifetime is increased still further, since a reliable overheating protection is provided by temperature monitoring and starter time limits.

Additional advantageous embodiments of the invention are claimed and described in the appended dependent claims.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENT

Figure 1:
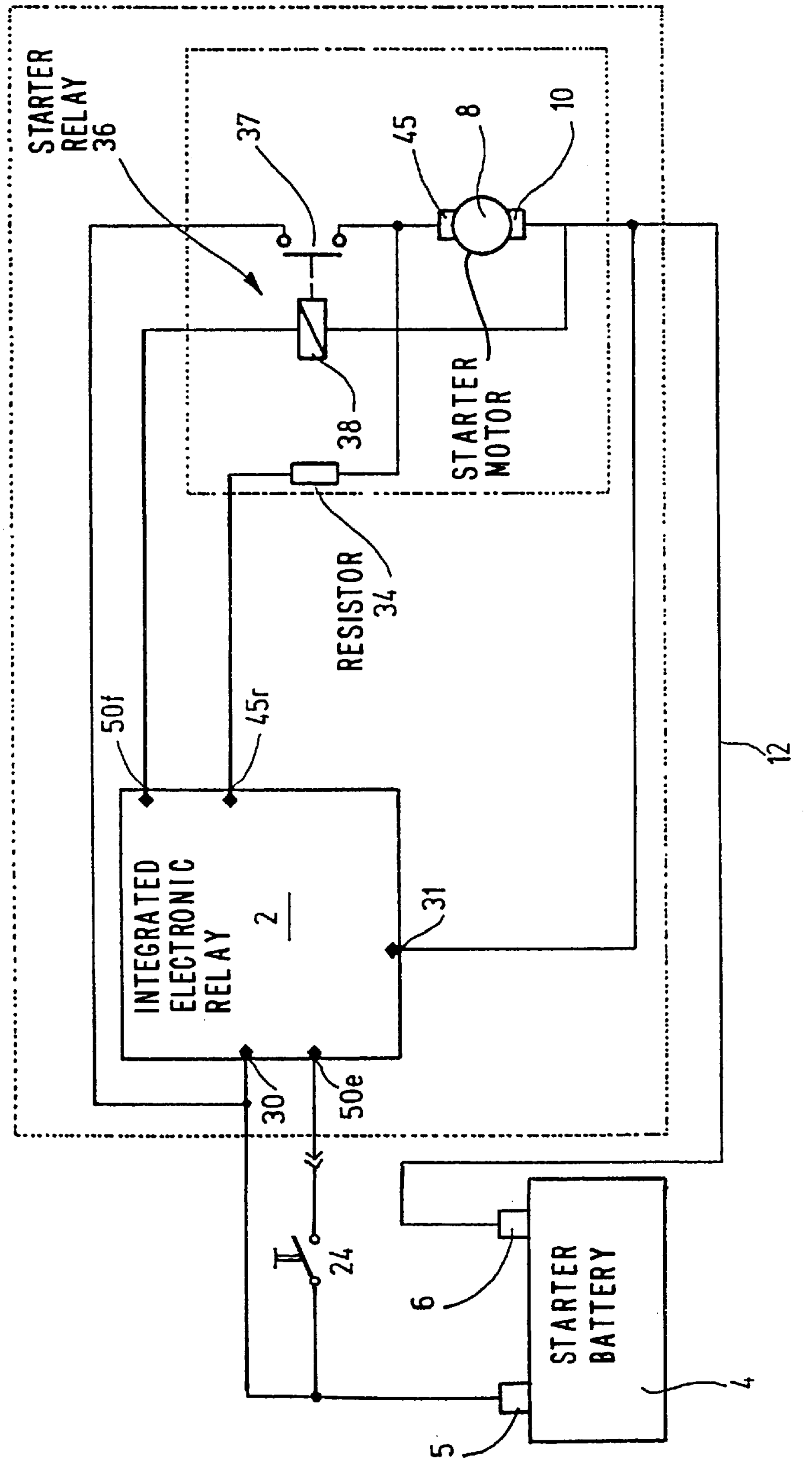
FIG. 1 is a schematic circuit diagram of an apparatus for two stage starter control according to the invention.

FIG. 1 is a main circuit diagram of an arrangement according to the invention for two-stage control of an electrical starter motor of an internal combustion engine of a motor vehicle. The arrangement includes an electrical energy source, a starter battery 4 with a positive pole 5 and a negative pole 6, and an electrical starter motor 8 as well as the required electrical connections and additional required components explained in more detail in the following for accomplishing a two-stage starting process. The starter motor 8 together with the required components for engagement of a starter pinion in a cranking gear of the drive train of a motor vehicle is illustrated as a single symbol for simplicity and improved visibility, since there are hardly any changes from the known systems. Furthermore the arrangement of the invention should be suitable for controlling known starter motors, in which hardly any modifications are required. A central control unit, designated in the following as an IER (integrated, electronic relay) 2, is shown in FIG. 1.

The IER 2 has several inputs, terminals for it, for the supply of voltage from the starter battery 4 and several controlling outputs. A terminal 30 that is connected to the positive pole 5 of the starter battery by means of a lead and a terminal 31 that is connected to the negative pole 6 of the starter battery by another lead are provided for supplying the nominal voltage (usually 12 or 24 volts). Another terminal **50*e* is provided as an additional input, which is connectable by means of a starter switch 24 with the voltage source 4. Instead of that a relay control is possible, in which an additional further removed switch can act on a relay coil, which can be provided for switching the starter switch 24**. With electronic starting it is also possible to accomplish this by means of a signal from an engine electronic circuit.

The IER 2 has a terminal **45*r* acting as a control output, from which a lead with an intervening multiplier resistor 34 is connected electrically to the principal terminal 45 of the starter motor 8. A second control output 50*f* is shown connected to a starter relay 36 by means of a connecting line. This starter relay 36 has a relay coil 38 and a switch controllable by the relay coil 38. The controllable switch is designated the main bridge 37 in the following. The terminal 50*f* of the IER 2 is connected with a terminal of the relay coil 38. The other terminal of the relay coil 38 is connected via a ground lead to ground 12 of the motor vehicle, which, in turn, is connected with the negative pole of the starter battery 4**.

A two-stage starting process is outlined in the following with the aid of the schematic circuit diagram illustrated in FIG. 1. A condition should already be made when the ignition is turned on, in which the connections of the terminals 30 of the IER 2 to the positive pole 5 of the starter battery 4 and of the terminal 31 to ground and thus to the negative pole of the starter battery should already exist. When the driver operates the starter switch 24, the entire nominal voltage of the starter battery 4 is applied to the terminal **50*e*. This voltage $U_{50e}$ can be processed in the IER 2, so that an output voltage $U_{45r}$ is present after a short time delay at terminal 45*r*, which corresponds operatively to the nominal voltage of the starter battery 4 and activates the starter motor 8** gently in a first step.

The entire nominal voltage of the starter battery 4 is not applied to the terminal 45 of the starter motor 8, since a voltage drop from the nominal voltage of the vehicle power supply network occurs by means of the resistor 34 in the line from the terminal **45*r* to the terminal 45. The starter motor first runs slowly. After expiration of a time interval for overcoming the inertia for rotation of the starter motor 8, a control voltage $U_{50f}$ is applied to the terminal 50*f* of the IER 2 which flows through the relay coil 38 of the starter relay 36, which closes to the principal bridge 37 and activates the starter gear. As soon as the main bridge 37 of the relay 36 is closed, a direct electrical connection is made from the positive pole 5 of the starter motor 4 to the terminal 45 of the starter motor. The ground connector 10 of the starter motor 8 has always been connected to ground 12, so that on closing the main bridge 37** of the starter motor the entire nominal voltage of the power supply is obtained and the internal combustion engine is rotated at a higher rotation speed in a second step or stage until it achieves self-sustained operation.

Figure 2:
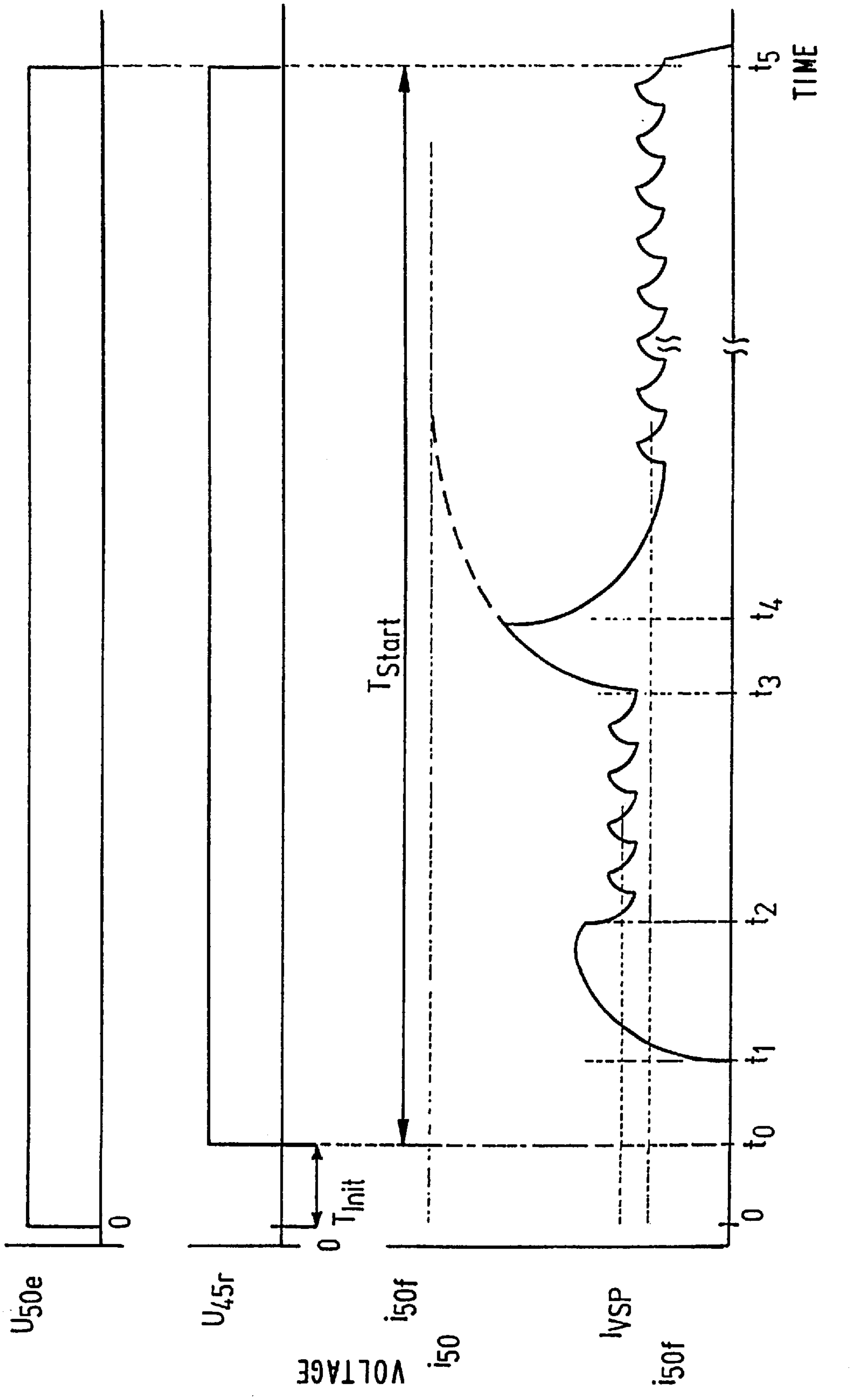
FIG. 2 includes a series of three graphical illustrations of the dependence of voltages and currents on starting time.

In FIG. 2 three different graphical illustrations show the principal and qualitative behavior of voltages and currents at the terminals **50*e*, 50*f* and 45*r* of IER 2 over the starter time interval $T_{start}$ (t=0 . . . $t_5$). The horizontal axis is the time on all three diagrams. The voltage $U_{50e}$ is shown on the vertical axis in the upper diagram and the voltage $U_{45r}$ is shown on the vertical axis of the central diagram. A current $i_{50f}$, which flows through the coil of the starter relay, is shown on the vertical axis of the lower diagram. The terminal 30 is electrically connected with the positive pole 5 and the terminal 31 is connected electrically with ground 12 and with the negative pole 6 of the starter battery 4. The starter time interval 0 to $t_5$ may be divided into several stages which are described with the aid of the following FIG. 2**.

When the starter switch 24 is operated by the driver the terminal **50*e* is acted on with the voltage $U_{50e}$, whereby the voltage $U_{50e}$ can be less than or correspond to that supplied from the battery 4. As can be determined in the upper graphical illustration of FIG. 2, the voltage $U_{50e}$ is maintained at a constant level from time point 0 to the time at which the entire starting process is over, which means until time point $t_5$. The voltage $U_{45r}$ is applied delayed to the terminal 45*r* by means of a timing controller to provide a predetermined initialization time interval $T_{init}$. The size of the voltage $U_{45r}$ usually corresponds in its amount to the voltage $U_{30}$. The control of the output at the terminal 45*r* and at the terminal 50*f*** occurs so that the time interval in the first place serves to avoid the uncontrolled voltage peaks occurring during the turning on process.

During the time interval from $t_0$ until at time point $t_1$ the power supply network is largely loaded only by the resistor 34. The resistor 34 thus determines the battery current flow. A torque is produced in the starter motor 8 by means of a voltage applied to terminal **45*r* and reduced relative to the voltage $U_{45r}$ by means of the resistor 34 and the armature starts to turn. The resulting reduced armature speed makes the later complete engagement easier. However because of the armature inertia the actual engagement is delayed somewhat, namely until time point $t_1$. The battery voltage is applied to terminal 50*f* by means of an electronic switch in IER 2 for release of a relay armature in the starter motor 8. The current flows according to the starter relay 36 and the voltage of the starter battery. The time interval between $t_0$ and $t_1$, which means the time interval between the start of rotation of the armature of the starter motor 8 and initial engagement, depends on the size of the resistor 34, whose resistance value again depends on the rotation speed appropriate for a certain starter motor 8**.

The (initial engagement) current at the terminal **50*f* at a time point $t_2$ is reduced by an oscillation around an average value $I_{vsp}$, observable in the lower trace in FIG. 2. The superimposed alternating current component is suitably selected so that the resulting magnetic force exerts no action on the motion of the armature. This is true when the periodic duration of the current oscillations are at most a fifth of the mechanical armature time constant (>10 ms). The current amplitude $I_{vsp}$ and the time interval $t_0$ and $t_1$ depend on the selected dimensions of the starter motor 8**. The starting pinion engages in each case on the crown gear at the time point $t_3$ and the compression spring (in case present) is already gently compressed.

After expiration of this initial engagement stage ($t_2$ to $t_3$) the main engagement stage ($t_3$ to $t_4$) occurs until at the time at which the terminal **50*f* reaches the nominal voltage $U_{50f}$ from the terminal 30. The voltage $U_{50f}$ present at the terminal 30 provides a switching of the relay 36 and thus the entire battery voltage is applied to the terminal 45 of the starter motor. The engagement spring compressed at the end of the initial engagement stage in the starter is completely compressed and acts to close the main bridge 37. When the main bridge 37 is closed the current $I_{45r}$ drops. If this does not occur during the engagement stage ($t_3$ to $t_4$), an idle circuit is present and the start process is interrupted by a logic device provided in IER 2**.

After closing the main bridge 37, which means at time point $t_4$, the relay 36 is provided with a holding current $I_{50fNenn}$. The starter motor 8 turns now with its full torque. The terminal **50*e* remains controlled through the terminal 50*f*. Generally the adjustment of the holding current to the average value $I_{50fNenn}$ occurs now by pulses in order to reduce the thermal load on the coil in the starter motor. This is detected by the jagged signal $I_{50fNenn}$ in the lower illustration in FIG. 2**.

The individual time intervals ($t_n$ . . . $t_{n+1}$; with n=0 . . . 4) can be adjusted independently of each other and can take arbitrary positive values. During the time interval from $t_0$ to $t_1$ the power supply network is predominantly loaded by the resistor 34 for the pinion rotation of the starter motor 8. The resistance value of the resistor 34 determines the battery current. The power supply network resistance may be determined together with a measurement of the unloaded battery voltage prior to starting, which means during the initialization time interval, $T_{init}$. A measurement of the battery voltage at the terminal 30 during starting (at $t_4$) produces a value for the main starting current. This can be used as a measure for the internal temperature load of the starter motor 8. A temperature monitoring of the starter can then be performed by a heating model, which means the relationship with the current flow and the duration of the current flow in the starter motor.

Figure 3:
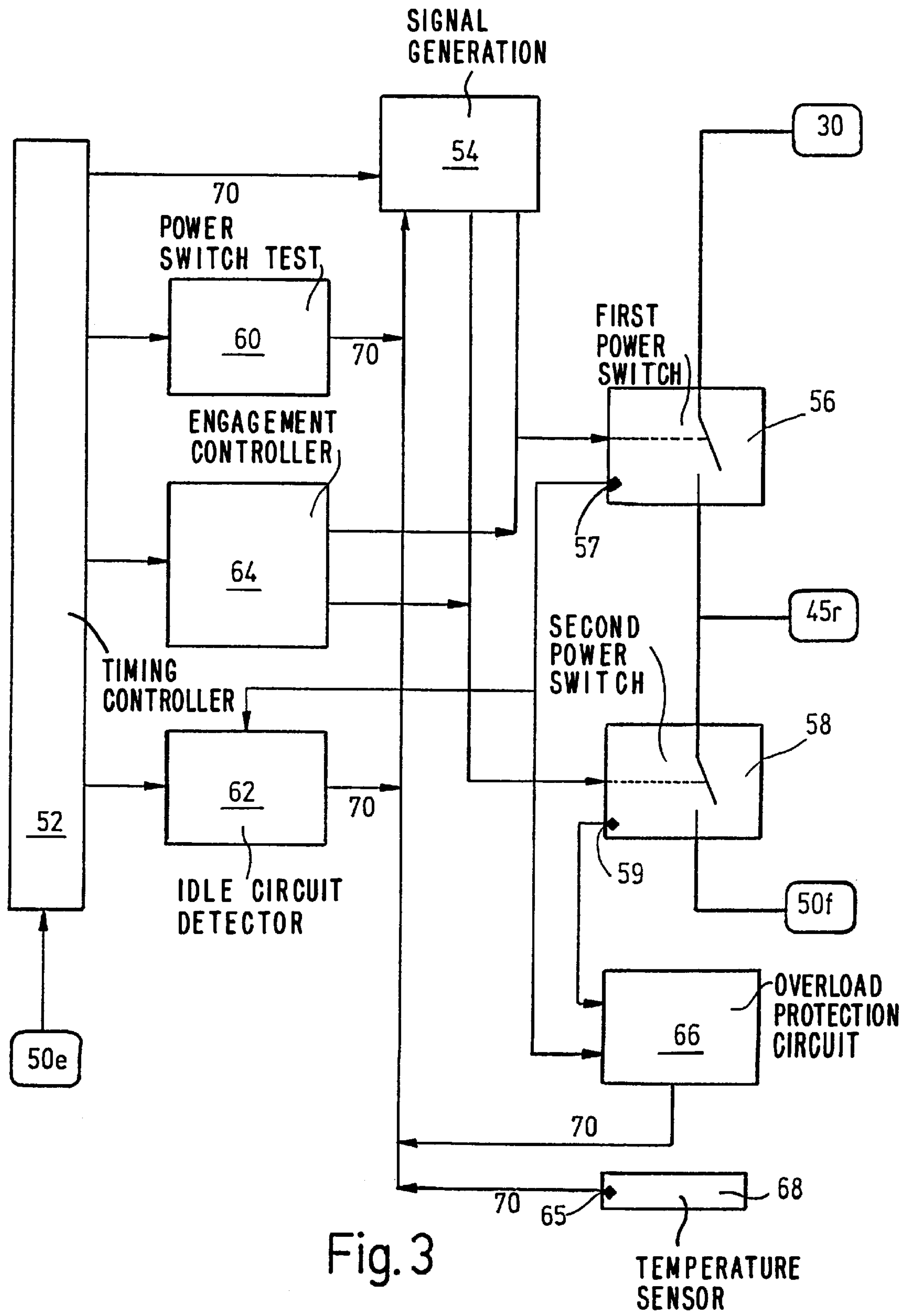
FIG. 3 is block circuit diagram for illustration of a starting process according to the invention.

FIG. 3 illustrates the operation of an integrated electronic relay IER 2 during a starting process in a block diagram. The same parts as in the foregoing figures are provided with the same reference numbers. Starting with application of the voltage $U_{50e}$ a timed control is initiated that provides for the two-step starting process at the time point $t_0$ after the initialization time interval, $T_{init}$. The engagement control circuit 64 provides for an appropriate running. In the following the customary term "end stage" is used for the commonly used term "electronic power switch". The term "end stage" here means any form of an electronic power switch.

An arrow extends from the engagement control circuit 64 to a first end stage 56 that is switched through at the time point $t_1$ and the voltage $U_{45r}$ is applied. The battery voltage $U_{Bat}$ applied to the terminal 30 from the starter battery 4 is switched through to the terminal 45*r*. The engagement control circuit 64 also provides for pulsing of the current amplitude $I_{vsp}$ during the time interval $t_2$ to $t_3$ by a suitable control by means of a second end stage 58.

At the time point $t_3$ the engagement control circuit then provides for switching through of the second end stage 58, whereby the battery voltage $U_{Bat}$=$U_{50f}$ is applied to the terminal 50*f*. The applied voltage $U_{50f}$ provides for the initial engagement of the pinion and for switching of the relay 36 and thus application of the full battery voltage $U_{bat}$ to the terminal 45 of the starter motor 8. It is thereby fully engaged and operates at the nominal rotation speed. With the main bridge 37 closed the current $I_{45r}$ in the relay 36 must drop, which is measured by an idle circuit detection means 62. The first end stage 56 has a so-called sense output 57 that supplies a current proportional output signal $I_{sense}$. If the current does not fall during the idle circuit detection means, after expiration of a predetermined monitoring time, for example after 200 milliseconds, a so-called idle circuit is detected and an interrupt signal 70 is transmitted to a signal generator 54.

An idle circuit is present when the starter pinion, for example because of dirt, remains in the first stage and the main current is not turned on. This situation must be detected by the driver or by IER 2 and the start attempt must be interrupted, since otherwise the thermal load on the engagement relay will be too large. The signal generator 54 provides a start interrupt and opens the first end stage 56 and the second end stage 58.

In a simplified embodiment without sensor output 57 the first end stage 56 is generally turned off after expiration of the monitoring time (for example 200 ms). Within this time the main bridge 37 must be turned on. In this case the terminal 45*r* acts as input for supplying the second end stage 58 via the resistor 34. This second end stage 58 controls the output 50*f* in the already described manner. In the case of an idle circuit the main bridge 37 is not closed and the second end stage 58 is therefore not supplied. The output 50*f* remains then without applied voltage and the starting attempt is automatically interrupted.

If the first end stage 56 is short-circuited, a voltage $U_{45r}$ is measured at the terminal 45*r* in the not switched through state. The starter motor 8 was rotated in this case, but not initially engaged, so that there would be no reliability relevant errors. If the second end stage 58 is short-circuited when the first end stage 56 is activated, a voltage $U_{50f}$ at the terminal 50*f* is also measurable with the second end stage 58 not switched through. The first end stage 56 is turned off immediately in this case before the starter can be initially engaged. In both cases starting does not occur and an error is signaled to the driver. A redundancy is guaranteed by series connection of both end stages 56 and 58 that avoids an unwanted start when one of the end stages 56,58 operating as power switch is short-circuited.

Furthermore power is provided to an overload protective circuit 66 by each of the end stages 56,58, that supplies an interrupt signal 70 to the signal generator 54 when the end stage 56 and/or the end stage 58 is overloaded so that it can provide again for a starting interrupt. Moreover an end stage test 60 is provided that can supply an interrupt signal 70 to the signal generator 54.

The circuit is completed by a temperature sensor 68 that has an output 65 with a connection to the signal generator 54 and it supplies an interrupt signal 70 when activated. By measuring the battery voltage $U_{bat}$ prior to start the power supply resistance can be determined before starting. Measurement of the battery voltage $U_{bat}$ at terminal 30 during the course of the starting process provides a value for the main starting current. This can be used as a measure for the internal temperature load of the starter. Temperature monitoring without the temperature sensor in or at the starter can be accomplished by a heating model of the starter mechanics. The signal generator 54 finally has a connection to the timing controller 52 that can supply an interrupt signal 70 when the starting process has an excessively long duration.

Figure 4:
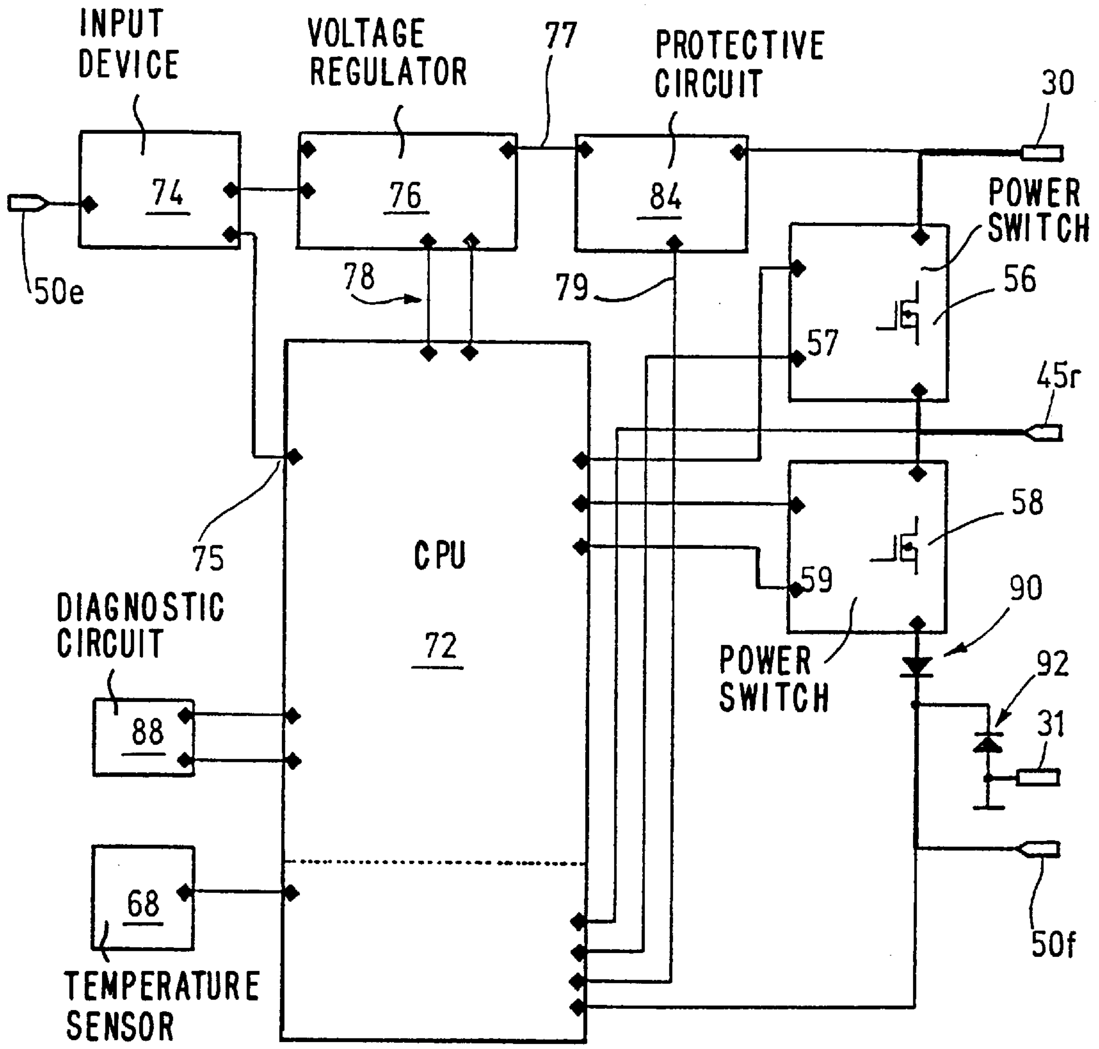
FIG. 4 is an exemplary embodiment of an internal inversion circuit of the second stage of the starter control process according to the invention.

FIG. 4 shows an exemplary embodiment of the IER 2 with peripheral circuitry appropriate and required for operation of the invention. The same parts as in the previous figures are indicated with the same reference numbers and still not illustrated. The IER 2 has a central processor that is indicated in the following as CPU 72. In this CPU 72 the signals of the entire peripheral circuitry, as already described in FIG. 3, are detected and the final stages 56,58 are controlled according to that. All control lines are drawn in FIG. 4 as comparatively weak solid lines for improved understanding. The inputs and outputs of the final stages 56 and 58 acted on with high currents, which means their electrical connection to the engagement relay 36 and the starter motor 8, are indicated with comparatively strong solid lines.

The IER 2 can contain end stages 56 and 58 acting as power switches in Highside-Power Switch Engineering. These components contain a power MOS-FET with control (charge pump), protective electronic circuitry (temperature, polarity inversion) and diagnostic functions (status output and current sensor). Similarly a discrete structure with MOS-FETs or other transistors with appropriate higher expense is similarly possible. The control in IER 2 is performed by a microcontroller, with internal ROM- and RAM-memory, watchdog and A/D converter. A discrete turn-off would similarly be possible for a clean starting process. The additional functions for monitoring may be integrated only with comparatively large expense.

In the following an example of circuitry including the CPU 72 for unobjectionable and trouble-free operation in a motor vehicle is described(FIG. 4). A buffering of the voltage supplied by the starter battery 4 is required so that no erroneous functions are activated in the CPU 72 by voltage fluctuations. No direct connection from the terminal 30 to the CPU is provided for this reason. Instead a protective circuit 84 is provided connected between them. This protective circuit 84 has a stabilized and buffered output 79 that provides the CPU with a constant direct voltage already free of superposed alternating components. Simultaneously the protective circuit 84 can be provided for an EMV protection, which means for electromagnetic compatibility or protection from high frequency interfering radiation.

A connection of the protective circuit 84 to a voltage regulator 76 is shown in FIG. 4. The voltage regulator 76 is provided with a stable 24 volts from the protective circuit and can provide the CPU 72 with smaller voltages (voltage supply 78), as are necessary, for example, for a permanent "refresh" of the RAM memory chips.

The control input at the terminal **50*e* of the IER 2 supplied with the signal from the starter switch 24 is connected with an input 74 that supplies a power-on-signal 75 to the CPU 72 depending on the received signal. In FIG. 4 a diagnostic circuit 88 is provided, with which the operation of the CPU 72 can be monitored and a qualitative error signal can be generated if an erroneous operation is observed. The already described temperature sensor 68, that supplies an interrupt signal 70 for interrupting the starting process when the starter motor 8 and/or the starter relay 36 threaten to overheat, has a direct connection to the CPU 72**.

Besides the control line (indicated with a weak solid line) to the protective circuit 84 the terminal 30 has a connection (indicated in bold) for supplying the first end stage 56 whose output is connected with the terminal **45*r* and the input of the second end stage 58. The output of the second end stage 48 is connected by means of an intervening inverting protective diode 90 with the terminal 50*f* and the voltage $U_{50f}$ required for control of the relay coil 38 of the starter relay 36. The inverting polarity protective diode 90 is connected to the terminal 50*f* in the connecting line in the conducting direction. Furthermore a connection (indicated in bold) of the n-output of the inverting polarity protective diode 90 to n-output, which means to a free-running diode 92 connected in a blocking direction to ground 12 or to terminal 31. This free-running diode 92 can provide for a short-circuit of the alternating current components in the supply voltage of the motor vehicle and thus provide for protection of the CPU 72 from damage by voltage peaks generated by turning off the relay coil 38. A control line (indicated with a weak line) to the CPU 72 is provided from the output to terminal 50*f* for monitoring the actual status of each individual input and output line of the IER 2**.

Finally the connecting lines for the CPU 72 are clearly detectable for controlling and monitoring both end stages 56 and 58. Besides both inputs for control of the first and second end stages 56 and 58 the first end stage 56 also has a sense output 57 and the second end stage 58 has a status output 58 which can supply the interrupt signal 70 for a start interrupt on erroneous operation.

The disclosure in German Patent Applications 197 45 115.2 of Oct. 11, 1997 and 198 11 176.2 of Mar. 14, 1998 is incorporated here by reference. These German Patent Applications include disclosure of the above-described invention that is claimed in the claims appended hereinbelow and provide a basis for a claim of priority for the instant invention under 35 U.S.C. 119.

While the invention has been illustrated and described as embodied in an apparatus and method for controlling an electrical starter of an internal combustion engine, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An apparatus for controlling an electrical starter motor for cranking a cranking mechanism of an internal combustion engine in order to start the internal combustion engine, said apparatus comprising circuit means for making an electrical connection between a voltage source and the electrical starter motor, by which the electrical starter motor is coupled with a cranking gear of the internal combustion engine by means of a shiftable transmission when the circuit means is energized; and an electronic control means for controlling at least one of a voltage, a current and an on-time of the electrical starter motor in a stepwise manner in a two-stage control process, said two-stage control process including a first stage in which said starter motor is operated at a rotation speed that is reduced in comparison to full rotation speed of said starter motor, so that wear is reduced in comparison to that experienced during a single-stage control process in which said starter motor is operated at the full rotation speed prior to being coupled with the cranking gear;

wherein the electronic control means is electrically connected between the voltage source and the electrical starter motor and is an integrated electronic relay (2); and wherein the electronic relay (2) includes a central processing unit and at least two electronic power switches (56,58) for switching the voltage of the starter motor and wherein said at least two electronic power switches are controllable in succession according to time parameters.

2. The apparatus as defined in claim 1, wherein the at least two electronic power switches (56,58) are connected in series with each other.

3. The apparatus as defined in claim 2, wherein the at least two electronic power switches (56,58) comprise respective power transistors.

4. The apparatus as defined in claim 2, wherein the at least two electronic power switches (56,58) comprise respective power-MOS-FETs.

5. The apparatus as defined in claim 4, wherein the at least two electronic power switches (56,58) include respective charge pumps for control.

6. The apparatus as defined in claim 5, wherein the at least two electronic power switches (56,58) comprise respective protective electronic circuits for protecting against excessive temperature and/or charge inversion.

7. The apparatus as defined in claim 6, wherein the at least two electronic power switches (56,58) have respective diagnostic outputs.

8. The apparatus as defined in claim 7, wherein a first (56) of the at least two electronic power switches (56,58) has a sense output (57) that provides an output signal proportional to current flowing through said first (56) of the at least two electronic power switches (56,58).

9. The apparatus as defined in claim 8, wherein the electronic relay (2) has at least two terminals (30,31) for power supply from the voltage source (4), at least one control input **(50*e*) and at least two control outputs (45*r*,50*f*)**.

10. The apparatus as defined in claim 9, wherein a first (56) of the at least two electronic power switches (56,58) is coupled with a first **(45*r*) of the at least two control outputs (45*r*,50*f*) and a second (58) of the at least two electronic power switches (56,58) is coupled with a second (50*f*) of the at least two control outputs (45*r*,50*f*)**.

11. The apparatus as defined in claim 9, wherein a first **(45*r*) of the at least two control outputs (45*r*,50*f*) is acted on by a voltage ($U_{45r}$) when the first (56) of the at least two electronic power switches (56,58)** is conducting.

12. The apparatus as defined in claim 9, wherein a second **(50*f*) of the at least two control outputs (45*r*,50*f*) is acted on by a voltage ($U_{50f}$) when the second (58) of the at least two electronic power switches (56,58)** is conducting.

13. The apparatus as defined in claim 12, wherein a first (56) of the at least two electronic power switches (56,58) is connected by a resistor (34) with a main terminal (45) of the electrical starter motor (8) and the electrical starter motor (8) is provided with said current and said current is less than a nominal current thereof.

14. The apparatus as defined in claim 12, further comprising a starter relay (36) connected electrically between the voltage source (4) and the starter motor (8) and having a relay coil (38) arranged so that said starter relay (36) is conducting when said relay coil is energized, and wherein a second (58) of the at least two electronic power switches (56,58) includes means for applying the voltage ($U_{50f}$) to said relay coil (38).

15. The apparatus as defined in claim 1, wherein the circuit means includes a manually operable starter switch (24).

16. The apparatus as defined in claim 1, wherein the circuit means includes an electronically operable starter switch (24).

17. The apparatus as defined in claim 16, wherein the electronically operable starter switch (24) is controllable by an electronic motor.

18. The apparatus as defined in claim 17, further comprising a timing controller (52) including means for controlling a control current ($I_{vsp}$) of the electrical starter motor.

19. The apparatus as defined in claim 18, wherein the timing controller (52) controls the control current ($I_{vsp}$) according to an operating time of the electrical starter motor.

20. A method for controlling an electrical starter motor for cranking a cranking mechanism of an internal combustion engine in order to start the internal combustion engine, said method comprising the steps of:

a) providing circuit means for making an electrical connection between a voltage source and the electrical starter motor, with which the electrical starter motor is coupled with a cranking gear of the internal combustion engine by means of a shiftable transmission when the circuit means is energized; and b) controlling at least one of a voltage, a current and an on-time of the electrical starter motor in a stepwise manner in a two-stage control process by means of an electronic control unit connected between the voltage source and the electrical starter motor, said two-stage control process including a first stage in which said starter motor is operated at a rotation speed that is reduced in comparison to full rotation speed of said starter motor, so that wear is reduced in comparison to that experienced during a single-stage control process in which said starter motor is operated at the full rotation speed prior to being coupled with said cranking gear;

wherein the electrical starter motor has a starter pinion engaged with the cranking gear in a first stage of the two-stage control process and the starter motor is rotated at full speed in a second stage of the two-stage control process; and wherein the circuit means includes a starter switch (24) and the electronic control unit provides said voltage of the electrical starter motor, when the starter switch is closed, and said voltage is less than a nominal voltage of the electrical starter motor until the starter pinion engages with the cranking gear.

21. The method as defined in claim 20, wherein the electrical starter motor is operated with a torque less than a nominal torque thereof during engagement of the starter pinion with the cranking gear and the electrical starter motor rotates the internal combustion engine with said nominal torque after a successful engagement of the starter pinion with the cranking gear has occurred.

22. The method as defined in claim 21, wherein the electronic control unit has a timing controller (52), and further comprising changing said voltage of the electrical starter motor according to an operating time of the electrical starter motor by means of the timing controller (52).

23. A method for controlling an electrical starter motor for cranking a cranking mechanism of an internal combustion engine in order to start the internal combustion engine, said method comprising the steps of:

a) providing circuit means for making an electrical connection between a voltage source and the electrical starter motor, in which the electrical starter motor is coupled with a cranking gear of the internal combustion engine by means of a shiftable transmission when the circuit means is energized;

b) controlling at least one of a voltage, a current and an on-time of the electrical starter motor in a stepwise manner in a two-stage control process by means of an electronic control unit connected between the voltage source and the electrical starter motor; and c) reducing a maximum allowed on-time of the electrical starter motor according to a temperature measured at the electrical starter motor.

* * * * *